US006766043B2

(12) United States Patent  (10) Patent No.: US 6,766,043 B2
Zeng et al.  (45) Date of Patent: Jul. 20, 2004

(54) PLEURAL NODULE DETECTION FROM CT THORACIC IMAGES

(75) Inventors: Xiaolan Zeng, Santa Clara, CA (US); Wei Zhang, Union City, CA (US)

(73) Assignee: R2 Technology, Inc., Sunnyvale, CA (US)

(*) Notice: Subject to any disclaimer, the term of this patent is extended or adjusted under 35 U.S.C. 154(b) by 101 days.

(21) Appl. No.: 09/993,789

(22) Filed: Nov. 23, 2001

(65) Prior Publication Data

US 2003/0099389 A1 May 29, 2003

(51) Int. Cl.$^7$ .......................... G06F 17/00; G06K 9/46; G06K 9/52; G06K 9/62
(52) U.S. Cl. ...................... 382/128; 382/173; 382/199; 382/257; 378/62; 128/922
(58) Field of Search .................. 382/128, 130, 382/131, 132, 173, 199, 257, 270; 378/62; 128/922

(56) References Cited

U.S. PATENT DOCUMENTS

| | | | | |
|---|---|---|---|---|
| 5,757,953 A | * | 5/1998 | Jang | 382/132 |
| 5,881,124 A | * | 3/1999 | Giger et al. | 378/8 |
| 5,982,917 A | * | 11/1999 | Clarke et al. | 382/132 |
| 6,058,322 A | * | 5/2000 | Nishikawa et al. | 600/408 |
| 6,078,680 A | * | 6/2000 | Yoshida et al. | 382/128 |
| 6,125,194 A | * | 9/2000 | Yeh et al. | 382/132 |
| 6,138,045 A | * | 10/2000 | Kupinski et al. | 600/425 |
| 6,185,320 B1 | * | 2/2001 | Bick et al. | 382/132 |
| 6,335,980 B1 | * | 1/2002 | Armato et al. | 382/132 |
| 6,549,646 B1 | * | 4/2003 | Yeh et al. | 382/132 |
| 2002/0006216 A1 | * | 1/2002 | Armato et al. | 382/131 |

OTHER PUBLICATIONS

M.L.Giger, Computerized scheme for the detection of pulmonary nodules, Proceedings of the Annual International Conference of the IEEE Engineering in Engineering in Medicine and Biology Society, Nov. 9–12, 1989, vol 2, p 626–627.*

Cohen et al, Finite–element methods for active contour models and balloons for 2–D and 3–D images, IEEE Transactions on Pattern Analysis and Machine Intelligence, Nov. 1993, vol 15, iss 11, p 1131–1147.*

Kawata et al, Classification of pulmonary nodules in thin–section CT images based on shape characterization, Proceedings of the International Conference on Image Processing, Oct. 26–29, 1997, vol 3, p 528–530.*

Yoshida et al, Wavelet snake for classification of nodules and false positives in digital chest radiographs, Proceedings of the IEEE Conference of Engineering in Medicine and Biology Society, Oct. 30–Nov. 2, 1997, vol 2, p 509–512.*

(List continued on next page.)

*Primary Examiner*—Bhavesh M. Mehta
*Assistant Examiner*—Christopher Sukhaphadhana
(74) *Attorney, Agent, or Firm*—Morgan, Lewis & Bockius LLP

(57) ABSTRACT

An algorithm is disclosed that recovers regions of possible pleural nodules left out of an organ field or otherwise undetected due to the nature of low level image processing in the organ field. A morphological closing with an elliptical structuring element is performed on a region to detect nodules within the size of the ellipsoid. A deformable surface-based analysis is performed in distinctive regions for the identification of larger nodules. The integrated use of a deformable surface model and chamfer distance potential enables explicit representation of regularized, or smoothed, surfaces within which nodule candidates may be detected.

53 Claims, 11 Drawing Sheets

OTHER PUBLICATIONS

Kanazawa et al, Computer–aided diagnosis for pulmonary nodules based on helical CT images, IEEE Nuclear Science Symposium, Nov. 9–15, 1997, vol 2, p 1635–1639.*

Kawata et al, Quantitative surface characterization of pulmonary nodules based on thin–section CT images, Nov. 9–15, 1997, vol 2, p 1218–1222.*

Yoshida et al, Computer–aided diagnosis of pulmonary nodules in chest radiographs: a wavelet–based snake approach, Proceedings of the IEEE Symposium on Computer–Based Medical Systems, Jun. 12–14, 1998, p 258–263.*

Kawata et al, Curvature based analysis of internal structure of pulmonary nodules using thin–section CT images, Proceedings of the International Conference on Image Processing, Oct. 4–7, 1998, vol 3, p 851–855.*

Kubo et al, Extraction of pulmonary fissures from HRCT images based on surface curvatures analysis and morphology filters, Proceedings of the International Conference on Pattern Recognition, Sep. 3–7, 2000, vol 1, p 490–493.*

Yongbum Lee et al, Automated detection of pulmonary nodules in helical CT images based on an improved template–matching technique, IEEE Transactions on Medical Imaging, Jul. 2001, vol 20, iss 7, p 595–604.*

* cited by examiner (i)
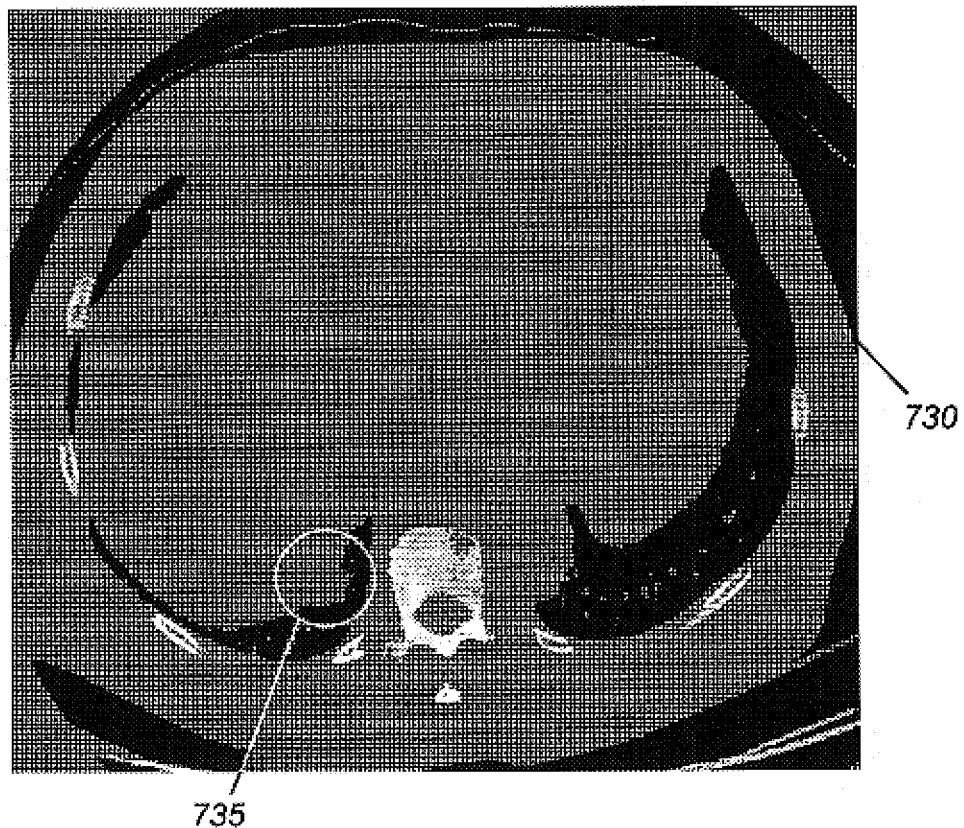
730
735
(ii)
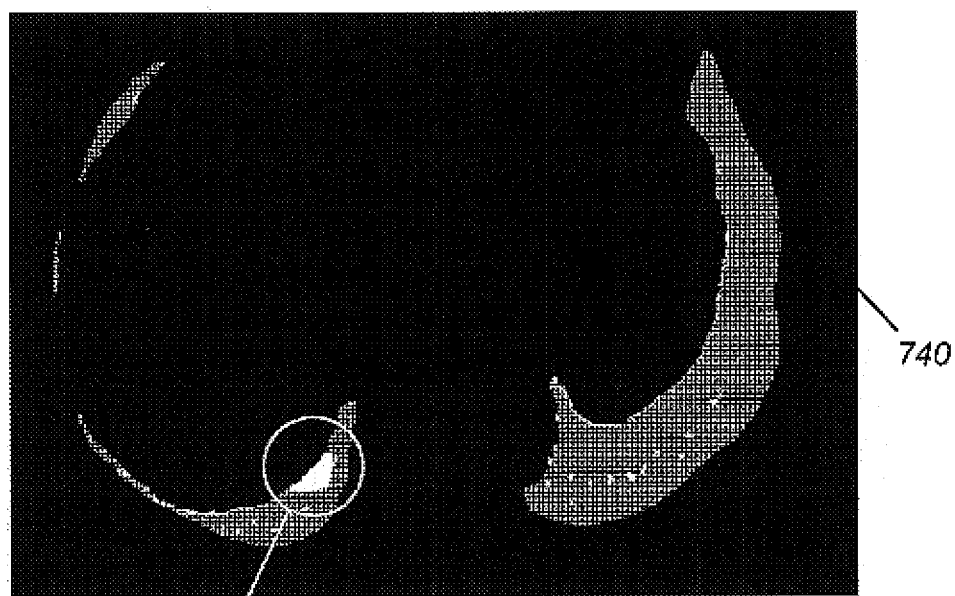
740
745  *FIG. 7(b)*

PLEURAL NODULE DETECTION FROM CT THORACIC IMAGES

CROSS-REFERENCE TO RELATED APPLICATIONS

Related applications are:

"Density Nodule Detection in 3-Dimensional Medical Images," Ser. No. 09/993,792, filed concurrently herewith;

"Method and System for the Display of Regions of Interest in Medical Images," Ser. No. 09/990,508, filed Nov. 21, 2001, "Vessel Segmentation with Nodule Detection," Ser. No. 09/993,791, filed concurrently herewith;

"Automated Registration of 3-D Medical Scans of Similar Anatomical Structures," Ser. No. 09/993,790, filed concurrently herewith;

"Lung Field Segmentation From CT Thoracic Images," Ser. No. 09/993,793, filed concurrently herewith; and "Graphical User Interface for Display of Anatomical Information," Ser. No. 09/990,511, filed Nov. 21, 2001, claiming priority from Ser. No. 60/252,743, filed Nov. 22, 2000 and from Ser. No. 60/314,582 filed Aug. 24, 2001.

This application hereby incorporates by reference the entire disclosure, drawings and claims of each of the above-referenced applications as though fully set forth herein.

FIELD OF THE INVENTION

The present invention relates to nodule detection from digital images. The invention further provides an algorithm for recovering and identifying regions of nodules and systems for using such an algorithm as an aid to medical diagnosis and disease evaluation.

BACKGROUND OF THE INVENTION

The diagnostically superior information available from data acquired from various imaging systems, especially that provided by multidetector CT (multiple slices acquired per single rotation of the gantry) where acquisition speed and volumetric resolution provide exquisite diagnostic value, enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital acquisition systems for creating digital images include digital X-ray film radiography, computed tomography ("CT") imaging, magnetic resonance imaging ("MRI") and nuclear medicine imaging techniques, such as positron emission tomography ("PET") and single photon emission computed tomography ("SPECT"). Digital images can also be created from analog images by, for example, scanning analog images, such as typical x-rays, into a digitized form. Further information concerning digital acquisition systems is found in our above-referenced copending application "Graphical User Interface for Display of Anatomical Information".

Digital images are created from an array of numerical values representing a property (such as a grey scale value or magnetic field strength) associable with an anatomical location referenced by a particular array location. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

Once in a digital or digitized format, various analytical approaches can be applied to process digital anatomical images and to detect, identify, display and highlight regions of interest (ROI). For example, digitized images can be processed through various techniques, such as segmentation. Segmentation generally involves separating irrelevant objects (for example, the background from the foreground) or extracting anatomical surfaces, structures, or regions of interest from images for the purposes of anatomical identification, diagnosis, evaluation, and volumetric measurements. Segmentation often involves classifying and processing, on a per-pixel basis, pixels of image data on the basis of one or more characteristics associable with a pixel value. For example, a pixel or voxel may be examined to determine whether it is a local maximum or minimum based on the intensities of adjacent pixels or voxels.

Once anatomical regions and structures are constructed and evaluated by analyzing pixels and/or voxels, subsequent processing and analysis exploiting regional characteristics and features can be applied to relevant areas, thus improving both accuracy and efficiency of the imaging system. For example, the segmentation of an image into distinct anatomical regions and structures provides perspectives on the spatial relationships between such regions. Segmentation also serves as an essential first stage of other tasks such as visualization and registration for temporal and cross-patient comparisons.

Key issues in digital image processing are speed and accuracy. For example, the size of a detectable tumor or nodule, such as a lung nodule, can be smaller than 2 mm in diameter. Moreover, depending on the particular case, a typical volume data set can include several hundred axial sections, making the total amount of data 200 Megabytes or more. Thus, due to the sheer size of such data sets and the desire to identify small artifacts, computational efficiency and accuracy are of high priority to satisfy the throughput requirements of any digital processing method or system.

Previous work in the area nodule detection as applied to thoracic region includes the following:

Lee et al proposed a template matching technique to detect lung wall nodules ("Pulmonary Nodule Detection in Helical X-Ray CT Images Based on an Improved Template-matching Technique", RSNA00; Y. Lee; T. Hara; H. Fujita; S. Itoh; T. Ishigaki; M. Tsuzaka). Semicircular models together with information on the tangent of lung wall curves were used in the matching process. This method suffers from inflexibility in dealing with the size variability of nodules.

Armato et al used a technique called rolling-ball (disk) ("A Computer-aided Diagnostic Method for the Detection of Lung Nodules in CT Scans". RSNA00. Samuel G. Armato et al.) In Armato, on each axial slice of digital lung images, a 2-D disk filter is successively placed tangential to points on the pleura. An indentation is identified when the disk filter contacts a contour at more than one location. Such indentation is then filled and brought back to the lung field as candidates of pleural nodules. A similar rolling-ball technique was used by Fetita in his work on bronchial tree reconstruction ("Three-Dimensional Reconstruction of Human Bronchial Tree in HRCT," SPIE99. C. Fetita, F. Preteux). Such a technique has difficulty optimizing the disk filter size and in controlling the spacing between test points on the pleura. It also has limitations in its extension to 3-D, and therefore does not fully exploit the smoothness of lung shapes.

It is desirable to provide such systems and methods for imaging that can effectively deal with the size variability of nodules. It is further desirable to provide nodule detection systems and methods that provide accurate results for diagnosis. It is desirable to provide a nodule detection approach for registering and detecting nodules from 2-D and 3-D data sets. It is desirable to provide a nodule detection approach that can be adapted to perform on partial volumes to reduce processing loads. It is further desirable to provide a nodule detection process and system that relies on common attributes such as image edges, texture, shapes and image amplitude. It is further desirable to provide a method and apparatus for improved sensitivity and specificity in lung nodule detection in digital imaging to enable early and accurate diagnosis.

Methods and apparatus in accordance with embodiments of this invention overcome the foregoing and other problems.

SUMMARY OF THE INVENTION

The present invention is directed to a method for detecting nodules that exploits various analytical techniques, including morphological closing and surface fitting with deformable models. An algorithm of the present invention recovers regions of possible nodules or tumors that would have been left out of the organ field or otherwise undetected due to the nature of low level image processing in the organ field. The algorithm uses a morphological dilation with a structuring element to detect nodules within the structuring element. Next, structuring element deformable surface-based analysis is performed in distinctive regions for the identification of larger nodules.

BRIEF DESCRIPTION OF THE FIGURES

These and other objects and advantages of the present invention will be more readily apparent from the following detailed description of a preferred embodiment of the invention in which:

FIG. 7(b) depicts a pleural nodule candidate on a lung base, indicated with a circle and identified in an axial section and in a corresponding recovered lung field image;

DETAILED DESCRIPTION OF THE INVENTION

Figure 1A:
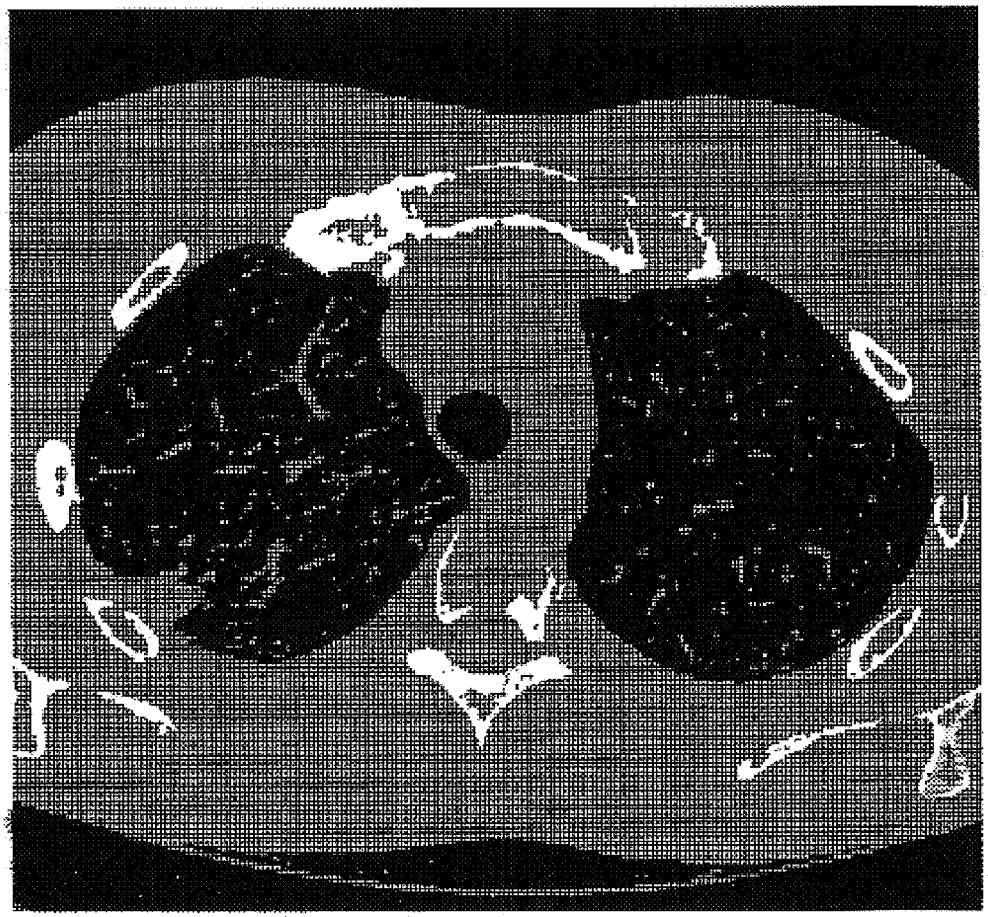
FIG. 1(a) depicts an axial section of a CT thoracic image volume.
Figure 1B:
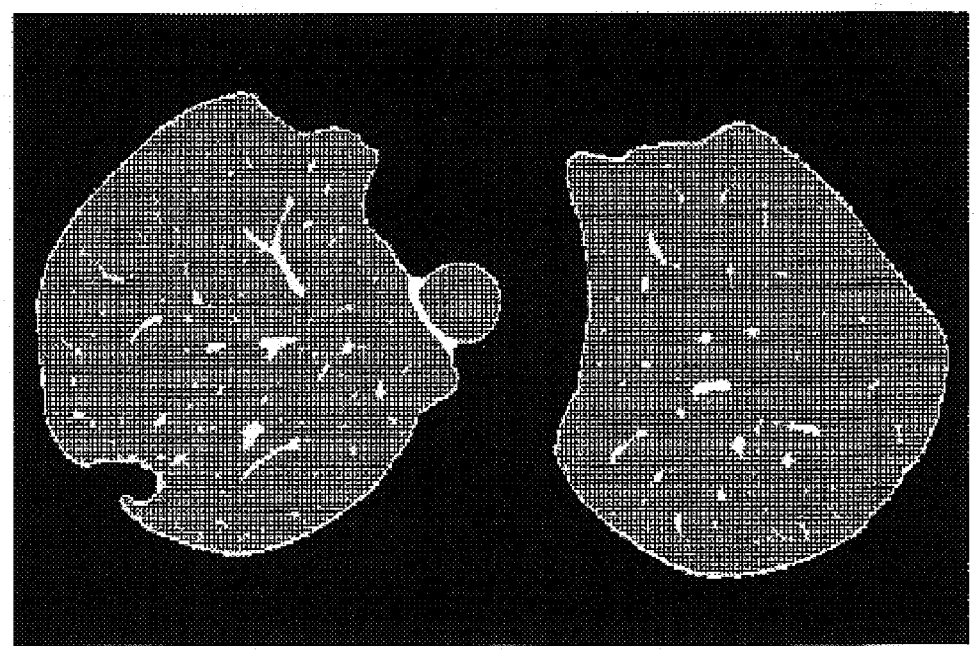
FIG. 1(b) depicts the result of lung field segmentation of the same axial section as in FIG. 1(a)

The present invention is preferably performed on a computer system, such as a Pentium™-class personal computer, running computer software that implements the algorithm of the present invention. The computer includes a processor, a memory and various input/output means. A series of CT axial or other digital images representative of a thoracic volume are input to the computer. Examples of such digital images or sections are shown in FIGS. 1(a) and 1(b). The terms "digital" and "digitized" as used herein will refer to images or volumes, as appropriate, in a digital or digitized format acquired via a digital acquisition system or via conversion from an analog image.

The present invention provides for systems and methods capable of effective and accurate nodule detection from 2-D and 3-D digital images, particularly thoracic images. The digital image sections to be processed, rendered, displayed or otherwise used include digitized images acquired through any plane, including, without limitation, saggital, coronal and axial (or horizontal, transverse) planes and including planes at various angles to the saggital, coronal or axial planes. While the disclosure may refer to a particular plane or section, such as an axial section or plane, it is to be understood that any reference to a particular plane is not necessarily intended to be limited to that particular plane, as the invention can apply to any plane or planar orientation acquired by any digital acquisition system.

The methods and systems disclosed herein can be adapted to other organs or anatomical regions including, without limitation, the heart, brain, spinal, colon, liver and kidney systems. The software application and algorithm disclosed herein can employ 2-D and 3-D renderings and images of an organ or organ system. For illustrative purposes, a lung system is described.

As used herein, the term "pleural nodules" refers to nodules that are based on pleura such as costal pleura and mediastinal pleura. Nodules that reside on interlobular fissures are not within the scope of this application. Pleural nodules have the appearance of protrusions from pleura, and can be identified as violations of the natural smoothness presented by the overall conical shape of lungs. Based on this characteristic, the problem of pleural nodule detection becomes one of pleural surface extraction and regularization, particularly in smoothness.

Figure 6:
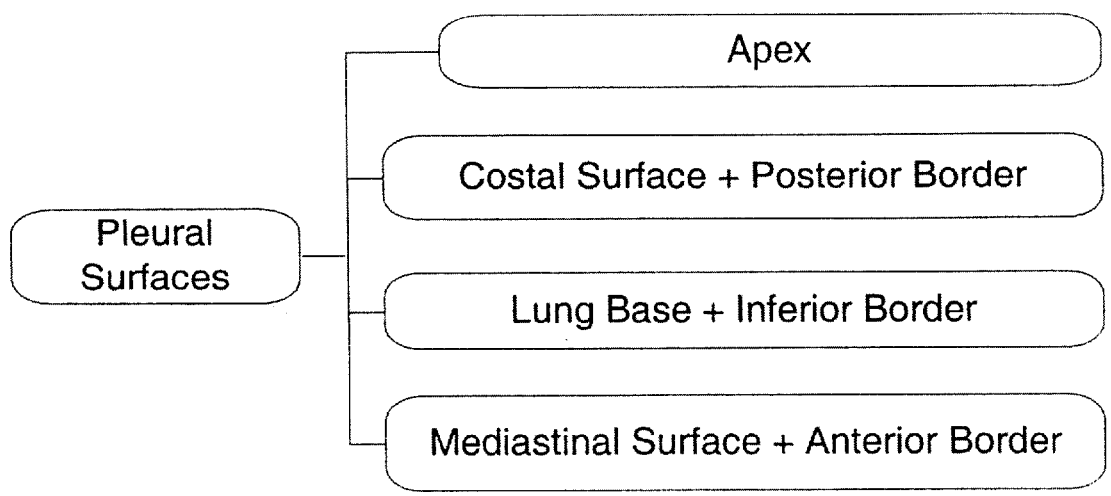
FIG. 6 depicts the dissection of pleural surfaces using anatomical guidelines for nodule analysis.
Figure 7A:
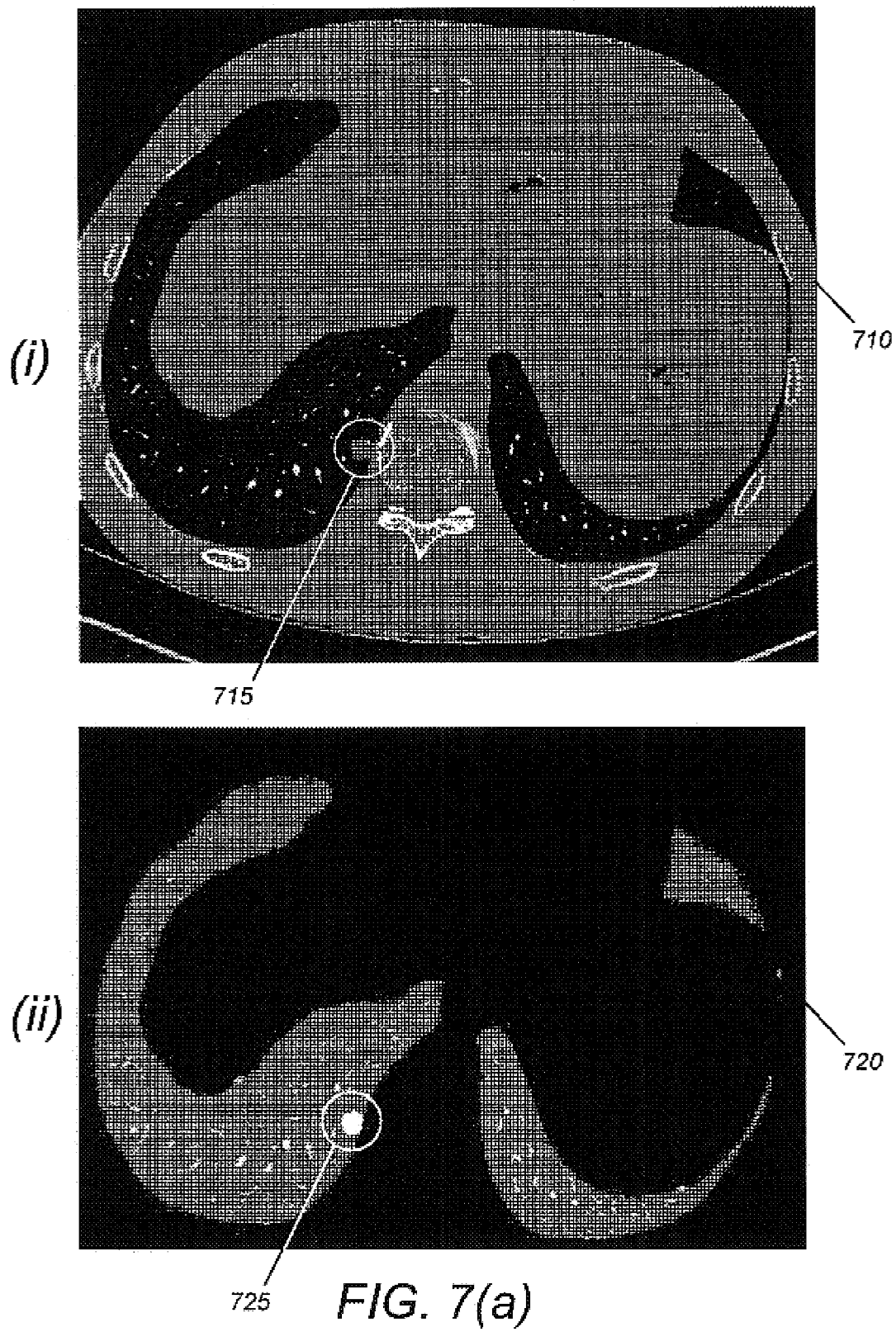
FIG. 7(a) depicts a pleural nodule candidate on a posterior lung border, indicated with a circle and identified in an axial section and in a corresponding recovered lung field image.
Figure 7C:
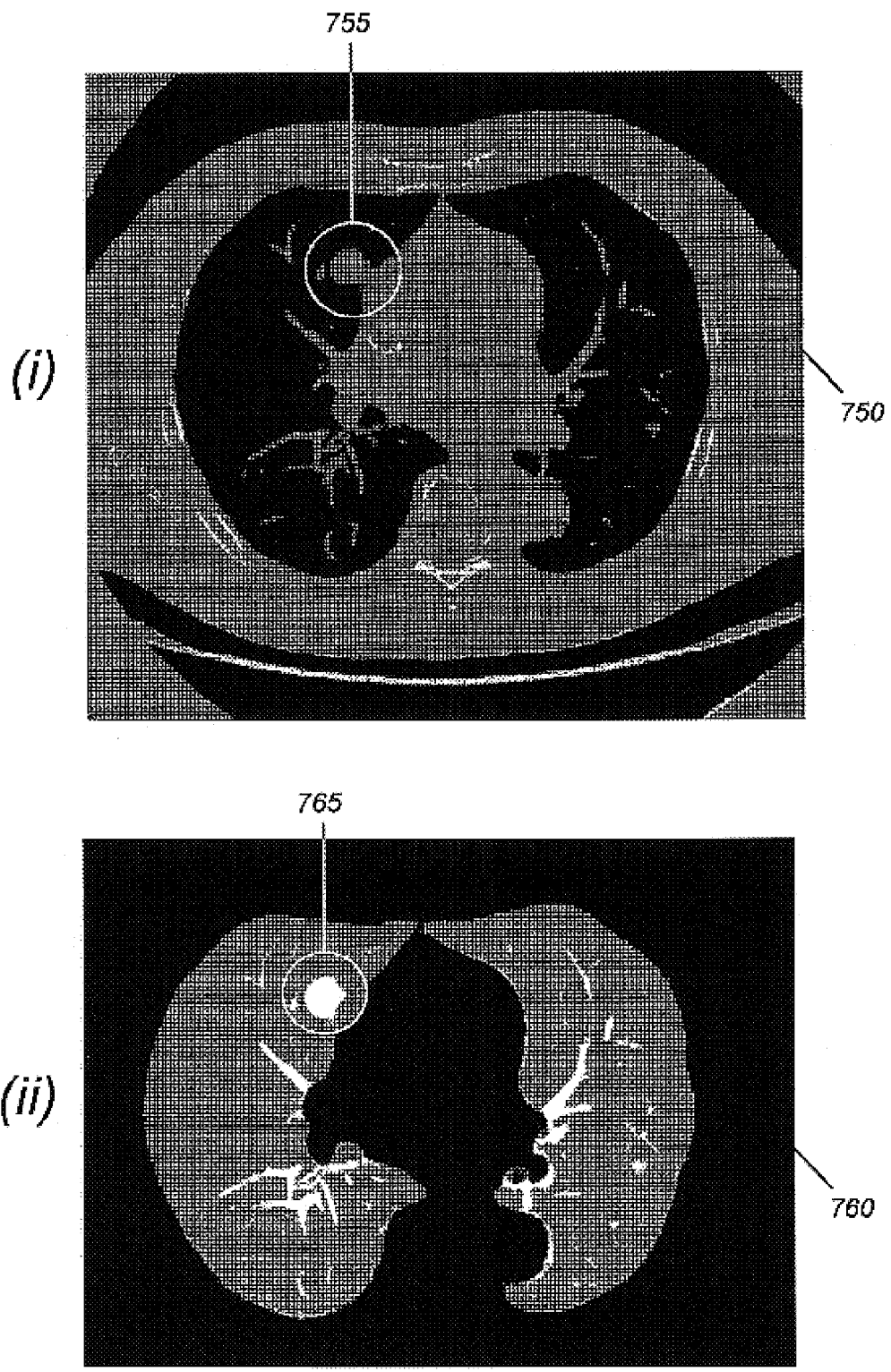
FIG. 7(c) depicts a pleural nodule candidate on a mediastinal surface, indicated with a circle and identified in an axial section and in a corresponding recovered lung field image.
Figure 7D:
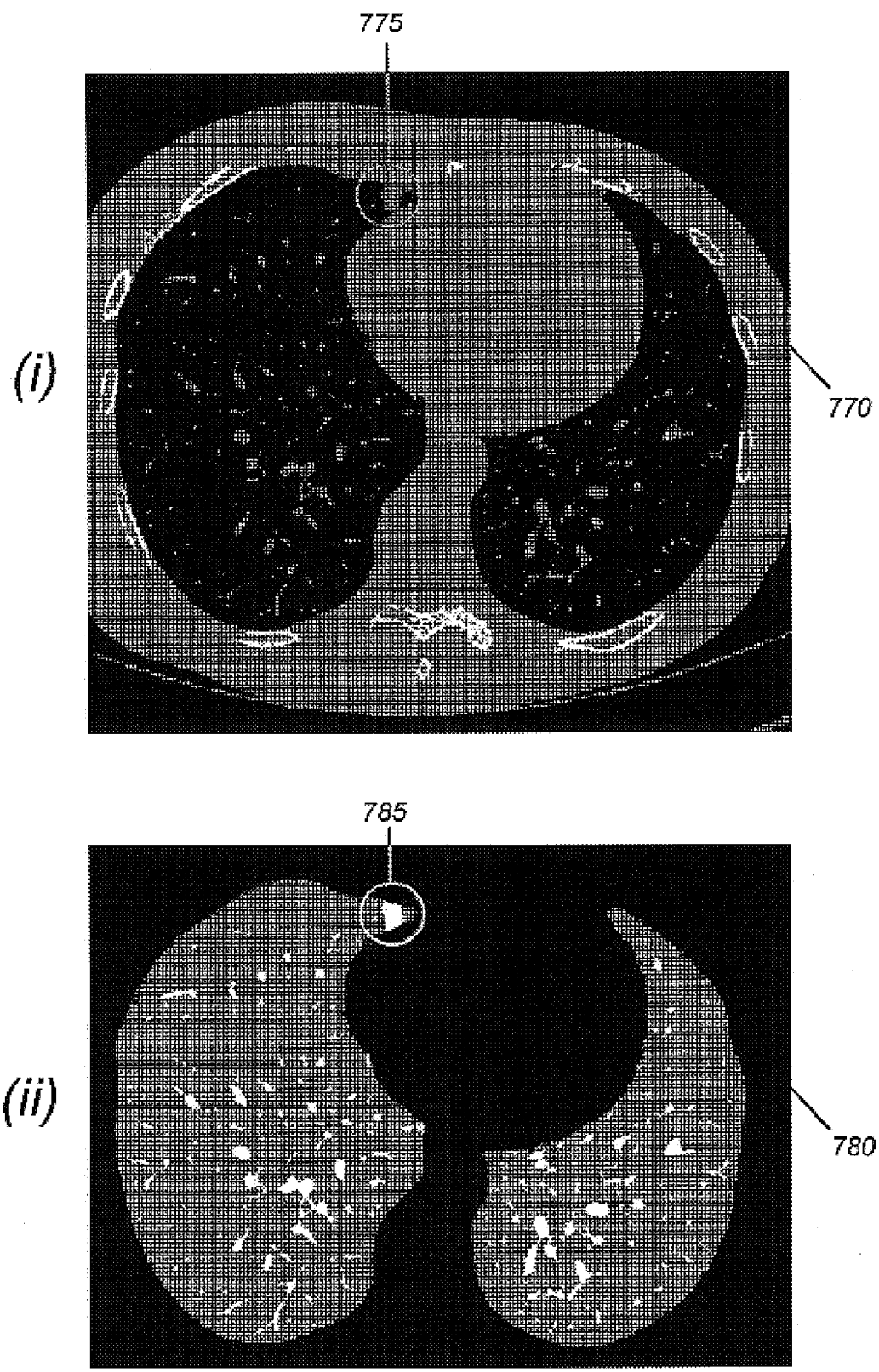
FIG. 7(d) depicts a pleural nodule candidate on an anterior lung border, indicated with a circle and identified in an axial section and in a corresponding recovered lung field image.

The anatomy of the lungs provides an excellent guideline for surface analysis, particularly given the general characteristics of lungs. For example, each lung is generally conical in shape, and presents for examination an apex, a base, three borders (inferior border, posterior border and anterior border) and two surfaces (costal surface and mediastinal surface). The problem of pleural surface analysis in thoracic volume can be dissected into surface fittings in four types, so as to reduce the complexity of the problem. This is further identified in FIG. 6:

Apex: The apex is rounded, and extends into the root of the neck, reaching from 2.5 to 4 mm. Volume averaging is usually heavy in the apex.

Costal surface and posterior border: Costal surface is smooth, convex and corresponds to the form of the cavity of the chest. Posterior border is rounded and is received into the deep concavity of either side of the vertebral column. The deformable surface is preferably initialized piece-wise linearly with landmark points on consecutive axial image sections, and deformed outward to fit the pleural boundary.

Lung base and inferior border: The lung base is broad, concave and rests upon the convex surface of the diaphragm. A deformable surface model can be conveniently initialized, for example, with landmark points on reconstructed saggital image sections on inferior borders.

Mediastinal surface and anterior border: In contact with the mediastinal pleura, mediastinal surface presents a deep concavity of cardiac compression. The anterior border is thin and sharp, and overlaps the front of the pericardium. The deformable surface model can also be conveniently initialized with landmark points on reconstructed saggital image sections for this fitting.

High accuracy of algorithms is crucial for successful nodule detection. Preprocessing generally reduces the complexity of the domain of the function to be estimated. Preprocessing is generally more effective when it is based on known characteristics of what is being imaged. For example, for lung fields, in addition to the above-identified characteristics, a natural lung image should be spatially smooth and strictly positive in amplitude. Examples of preprocessing techniques include various smoothing, morphological and regularization techniques.

The present invention involves two techniques of preprocessing: morphological closing for detecting smaller nodules and surface fitting with deformable models for recovering larger nodules. For the case of lungs, such nodules are pleural nodules. Segmentation is also preferably performed on a lung field image based on certain anatomic structures, such as the ribcage, that can be used in presegmentation and segmentation portions of an algorithm. The result of the segmentation algorithm is passed to subsequent processing. FIG. 1(b) pictorially depicts the result of lung field segmentation of the axial section of FIG. 1(a).

Figure 2:
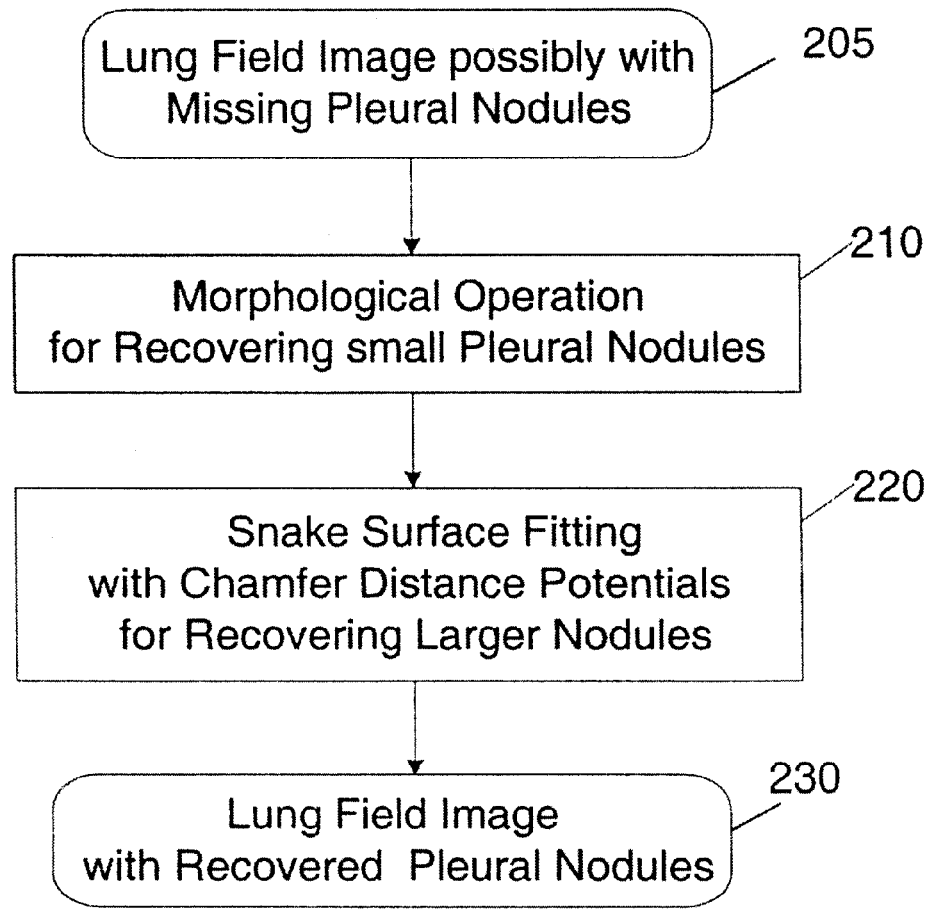
FIG. 2 is a flow chart depicting a preferred algorithm for pleural nodule detection through morphological operations and surface regularization.

FIG. 2 is a flow chart depicting a preferred algorithm for pleural nodule detection through surface regularization. The algorithm operates on slice sections and digital image volumes constructed from stacked slice sections through various construction techniques and methods known in the art. An image, and any resulting image volume, may be subject to noise and interference from several sources including sensor noise, film-grain noise and channel errors. Optional, but preferable, noise reduction and cleaning are initially performed on the image volume. Various statistical filtering techniques can reduce noise effects, including various known linear and non-linear noise cleaning or processing techniques. For example, a noise reduction filter employing a Gaussian smoothing operation can be applied to the whole image volume or partial image volume to reduce the graininess of the image.

The algorithm begins at step 205 with a series of digital lung field images. The lung field images preferably have been segmented and processed so as to identify and process the lung field, pleural boundary and other thoracic regions in accordance, for example, with the Ser. No. 09/993,793 for "Lung Field Segmentation from CT Thoracic Images," filed concurrently herewith and incorporated herein). Such processing may also have removed from the image certain image information relating to pleural nodules.

In accordance with the present invention, a morphological operation is performed at step 210 on a digital lung field image volume to recover small pleural nodules. General morphological closing "closes" gaps in and between image objects. Morphological closing is an increasing operation, composed of a known morphological dilation operation followed by a known morphological erosion operation. Morphology allows for filtering and/or enhancing only some characteristics of objects, depending on their morphological shape. A morphological filter depends on its structuring element, a small, quasi image that defines the operational neighborhood of a pixel. The structuring element is chosen to be ellipsoid. Closing the lung field images with an ellipsoidal structuring element smoothes the lung surface, fuses narrow breaks and thin gulfs and eliminates holes smaller in size than the ellipsoidal structuring element. Consequently, pleural nodules smaller than the size of the structuring element are recovered in the lung field images. Since morphological closing is a generic operation, it does not involve error-prone numerical calculations and is quite effective and robust.

Figure 3:
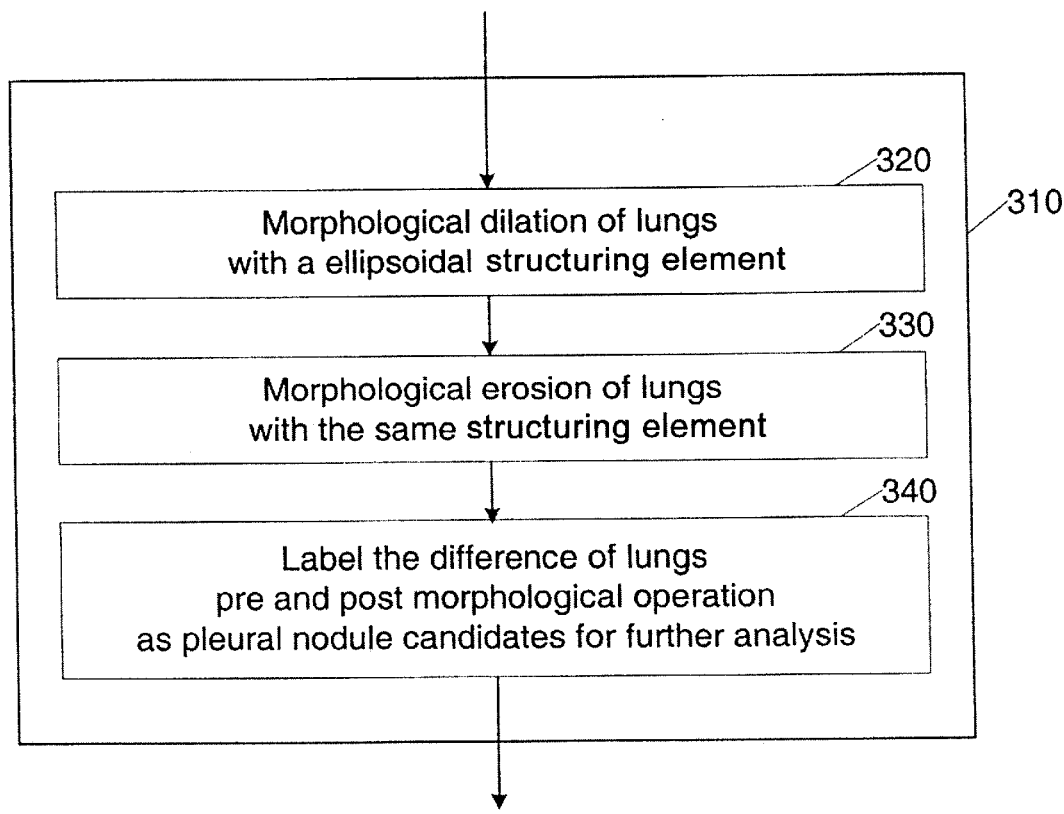
FIG. 3 is a flow chart depicting a preferred algorithm for the morphological operation.

Details of one morphological dilation and erosion operation 310 are provided in FIG. 3. At step 320, a morphological dilation of the lung field image is performed using an ellipsoidal structuring element. The size of the ellipsoidal structuring element is chosen with attention to sensitivity of the process and computational burden. The lower the size of the structuring element the higher the sensitivity of the morphological operation in detecting nodules. However, too small a size often yields excessive false positives and adds to computation burden. For purposes of detecting small pleural nodules, an ellipsoid having an average radius of 3 mm is selected. The average radius for an ellipse or ellipsoid is the average of its major axis and minor axis.

At step 330 a morphological erosion of the lungs is performed.

Next, the difference between the image volume before the morphological operation and the image volume after the morphological operation is labelled or otherwise identified or highlighted at step 340. These regions of difference in the lungs operation are identified as pleural nodule candidates for further analysis. Various methods of making such a comparison are known in the art. Examples of comparisons of pre- and post-morphological images are shown in FIGS. 7(a)–(d).

For nodules larger than the size of the ellipsoidal structuring element, a deformable surface model is used at step 220. The deformation begins with an initialization of the model via the landmarks associated with the lung or other organ. The basic idea is to explicitly extract known organ surfaces, such as lung surfaces. Thereafter, regularization and smoothing processes are applied to recovering regions of pleural nodules that are lost in the lung field segmentation. This approach can preferably be implemented using a surface fitting mechanism with a deformable surface model and a chamfer distance potential.

One illustrative approach using the chamfer distance potential technique is to search for a suitable match between two binary images: a candidate image and a reference image based on prior knowledge of object geometry. A distance map is generally created associating each pixel or voxel of the reference image with its distance from the closest profile pixel or voxel in the candidate image. The goal is to reduce an overall global distance that is a function of the sum of pixel-to-pixel or voxel-to-voxel distances. The candidate image is not directly superimposed on the reference image. Rather, the candidate image is preferably compensated via various geometric transformations, e.g., translations along x- and y-axes, rotation effects. A set of parameters is selected for the organ from which the global distance is computed or compared against, and the best fit is determined by minimizing a global distance function. The residual distance between the best compensated and the reference profiles can be used to determine whether an appropriate matching or comparison has occurred.

Deformable contour and surface models have been widely used in image segmentation. ("Snakes: Active Contour Models". IJCV88. M. Kass, A. Witkin and D. Terzopoulos; "Finite Element Methods for Active Contour Models and Balloons for 2D and 3D Images." IEEE Trans. PAM193. L. D. Cohen and I. Cohen.) In general, a deformable surface-fitting model is an energy-minimizing parameterized surface whose deformation in image space is driven by two forces—an external force that guides the surface toward the feature of interest, and an internal force that controls surface smoothness. The feature of interest in the present application is boundaries of the lung field. The external force in the present application is derived from chamfer distance potential instead of image gradient as in many applications of deformable models.

Figure 4:
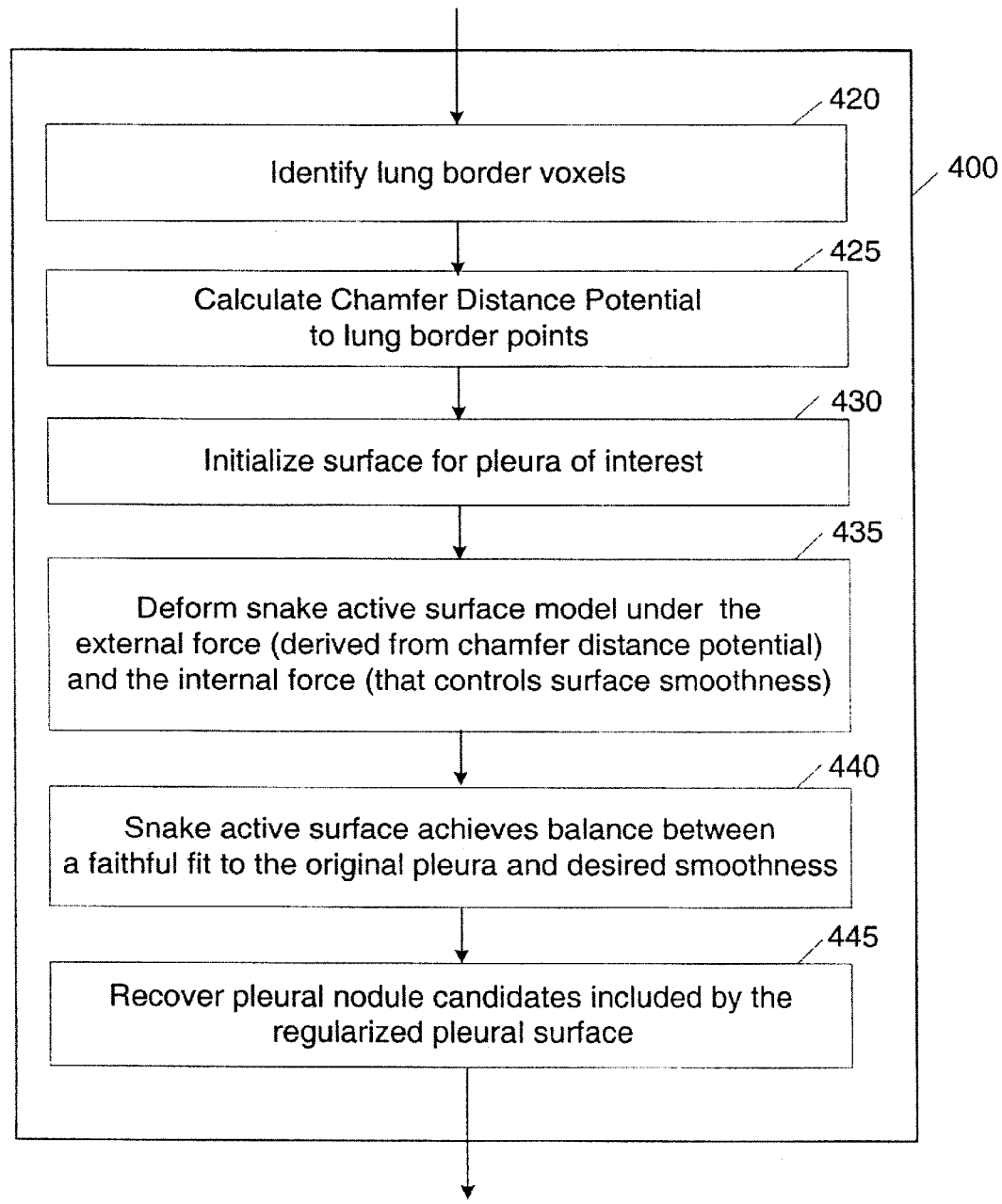
FIG. 4 is a flow chart depicting a preferred algorithm for surface regularization.

One use of a chamfer distance potential is as a measure of how close the deformable surface-fitting model is to the boundary of an organ volume. Chamfer distance is an approximation of Euclidean distance, and can be computed very efficiently with recursive operations. Further details of such a process 400 are shown in FIG. 4. At step 420, the algorithm identifies lung border voxels and at step 425 computes for each voxel in an image volume its chamfer distance to the nearest lung boundary point from the extracted lung field images. This computation of chamfer distance potential takes place only once before surface fitting.

In segmentation processses not involving lung shape analysis, large pleural nodules that show as prominent protrusions from the pleura are often lost due to their similarity in intensity to body volume. To ensure that such pleural nodules are included in the lung field, the pleura smoothness and other surfaces of interest are initialized at step 430. A deformable surface model is used to fit to the lung field boundary at 435. After a balance between the desired smoothness and a faithful fit to the pleura is achieved at 440, recovery of pleural nodule candidate is performed at 445.

Figure 5A:
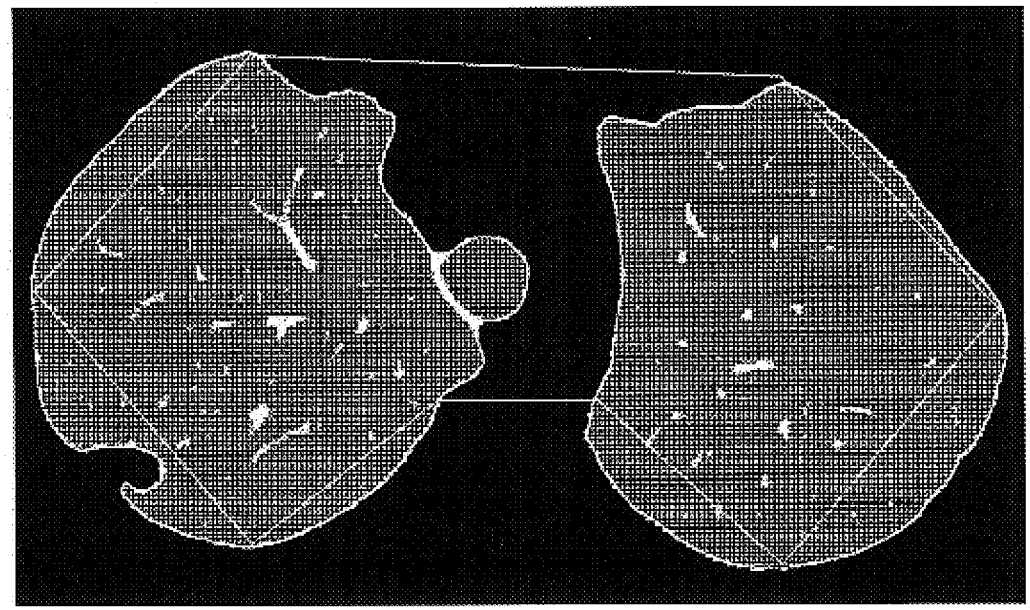
FIG. 5(a) depicts a deformable surface fitting model capturing costal pleura and posterior border for nodule detection.
Figure 5B:
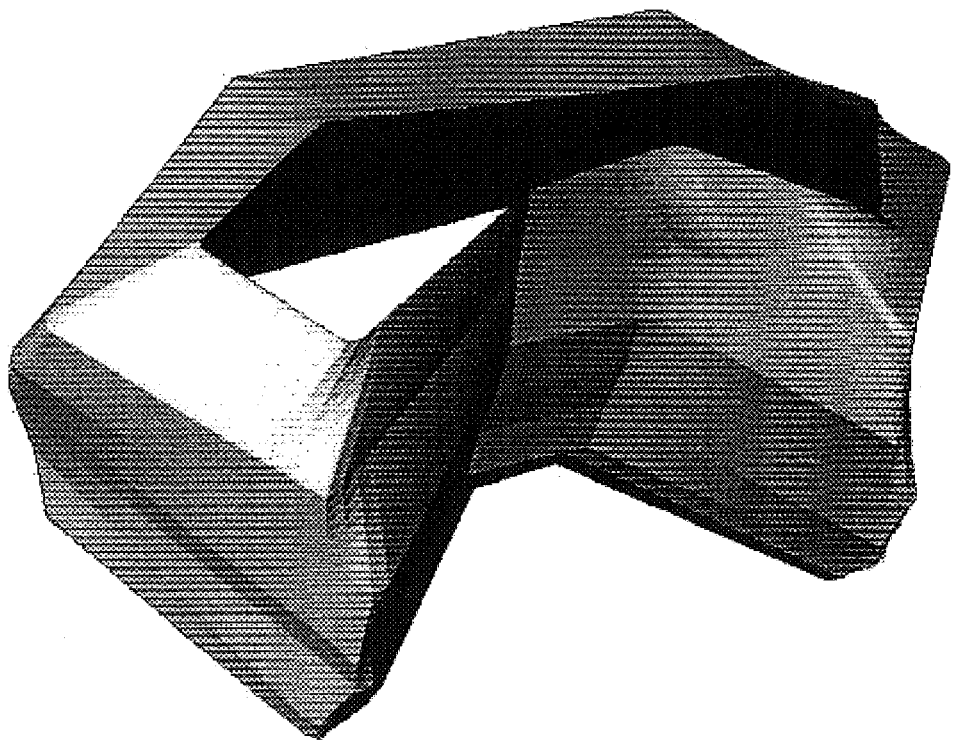
FIG. 5(b) depicts the initialization of the deformable surface fitting in 3-D view.
Figure 5C:
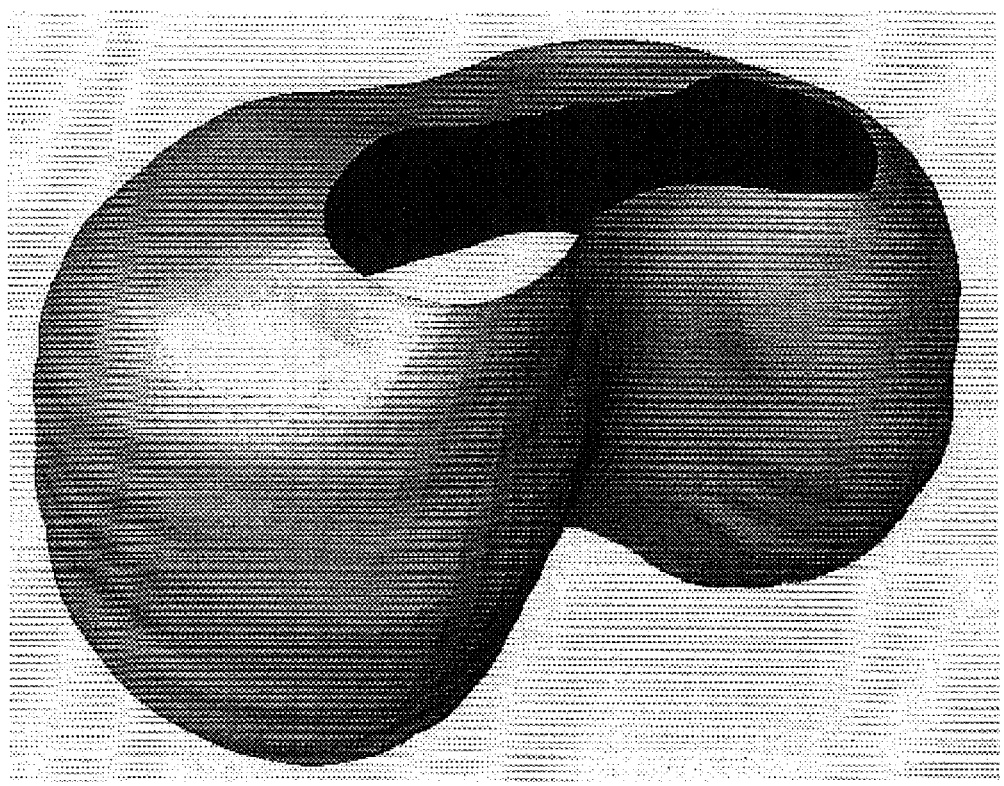
FIG. 5(c) depicts a deformable surface fitting after deformation achieving a balance between smoothness and faithfulness to the original pleura.
Figure 5D:
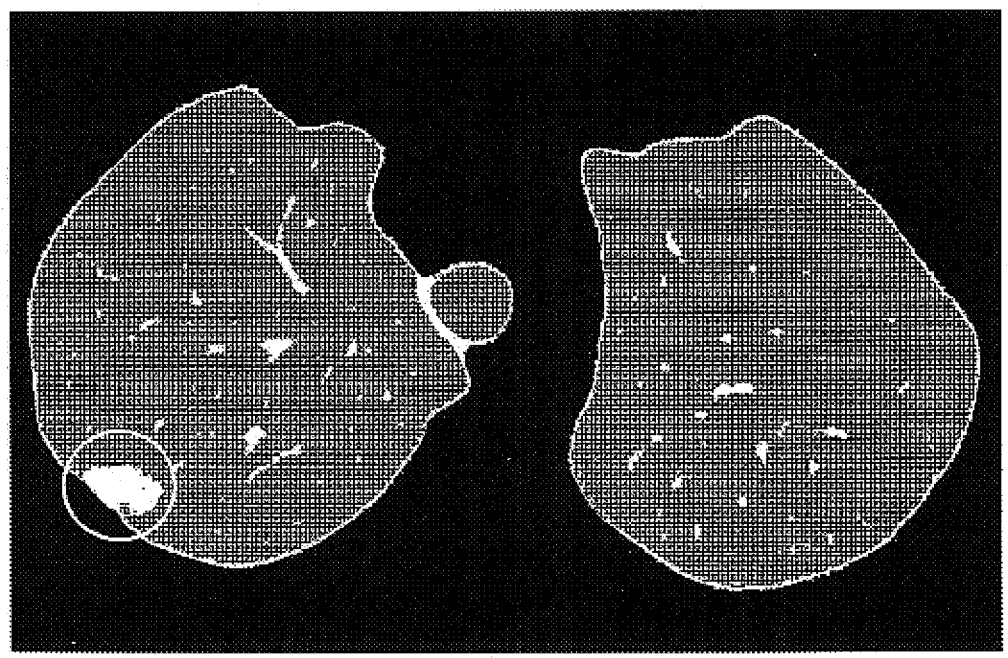
FIG. 5(d) depicts a recovered lung field on the same axial image section as in 4(a), with nodule candidate indicated with a circle.

Deformable surface-fitting capturing costal pleura and a posterior border for nodule detection are depicted in FIGS. 5(a)–(d). For the figures, the apex of the lungs is not included in any of the surface models, but the front of the pericardium is included. FIG. 5(a) shows the initialization of a deformable surface of an axial image section in accordance with step 430. A 3-D initialization of the deformable surface is depicted in FIG. 5(b). FIG. 5(c) is a representation of the deformable surface after deformation in accordance with step 440. The representation balances smoothness and faithfulness to the original pleura based on a chamfer distance potential and threshold. Approximately 6000 points on the surface were used in processing. Such a resolution results in acceptable results in the image. For example, the slight grooves on the surface correspond to overlying ribs. Recovery of nodule candidates in accordance with step 445 is represented by FIG. 5(d). A recovered lung field on the same axial image section as in (a) is shown in FIG. 5(d) with a pleural nodule candidate indicated by the circle. Further information and approaches regarding nodule detection and identification in 2-D and 3-D images is described, for example, in "Density Nodule Detection in 3-Dimensional Medical Images" referenced above.

After the morphological operation 210 is performed to recover and detect the smaller nodules, i.e. nodules that are detectable by a morphological dilation and erosion technique below the threshold size of the structuring element employed, and deformable surface fitting with chamfer distance potential analysis 220 is performed to detect and recover larger nodules, a lung field image with recovered small and large nodules is produced and displayed at 230.

FIGS. 7(a)–(d) depict pleural nodule candidates indicated with circles and identified in axial sections and in corresponding recovered lung field images processed by the algorithms disclosed herein. Each figure highlights a candidate nodule in a recovered lung field that may or may not be cancerous. However, as can be seen in FIGS. 7(a)–(d), the candidate nodules 725, 745, 765, and 785 in their respective recovered image 720, 740, 760, and 780 are more easily seen as compared to their corresponding image 715, 735, 755, and 775 in original axial images 710, 730, 750, and 770, respectively. The various candidate nodules can be shown highlighted in the recovered lung field images or in the axial sections for ease in identification. Moreover, recovered lung field images can be displayed alongside corresponding axial sections for ease in comparison. Various nodule highlighting systems and methods and various display configurations can be found in copending applications "Graphical User Interface for Display of Anatomical Information," Ser. No. 09/990,511, filed Nov. 21, 2001, claiming priority from Ser. No. 60/252,743, filed Nov. 22, 2000 and from Ser. No. 60/314,582 filed Aug. 24, 2001, each of which have been incorporated by references above.

For purposes of providing further details regarding the nodule detection algorithm disclosed herein, the following notations can be adopted for illustration:

S(u,v) denotes a parameterized deformable surface, (u,v) [0,1]x[0,1];

I denotes an image domain, and (x,y,z) denotes a voxel within I;

C denotes a chamfer distance potential on I;

N(u,v) denotes the outward normal direction of S(u,v).

The energy of the snake model is defined as:

$$\text{Energy} = E_{smooth} + E_{boundary} \quad (1)$$

$$= \int_\Omega [a(|S_u|^2 + |S_v|^2) + C] du\, dv$$

The first term in the function of Eqn. (1) is the internal energy that penalizes the unsmoothness of the deformable surface, and the second term is the external chamfer distance potential which draws the deformable surface right onto the pleural boundary. Minimizing the energy function above simulates the process of balancing between the two energies, resulting in a good surface fit with desired smoothness.

In general the surface deformation along tangent directions affects only surface parameterization and does not affect surface spatial location. If the surface deformation along tangent directions is ignored, the following equation can be derived from Equation (1) for the update of the surface model:

$$\frac{\partial S(u, v)}{\partial t} = F_{smooth} + F_{boundary} \quad (2)$$
$$= a(S_{uu} + S_{vv}) + (\nabla C \cdot N(u, v))N(u, v)$$

Given an initialization of the deformable surface, the above equation can be solved iteratively until the deformation of surface is within a pre-set threshold. Regions that are considered part of the resulting relaxed surface are considered as part of the lung field, and are used as candidates for further feature analysis and for the detection of nodules.

In the case of processing a single image section, or when inter-slice image smoothness is not significant (e.g. for images with large thickness), the above surface model can be simplified into a curve model for in-slice processing by retaining only the in-slice parameterization and smoothness constraint.

In this application, an efficient method for nodule detection from digital images is presented. The present invention provides a system and method that is accurate, efficient, flexible and detects pleural nodules that prior systems and approaches overlook or are incapable of detecting. The foregoing examples illustrate certain exemplary embodiments of the invention from which other obvious embodiments, variations, and modifications will be apparent to those skilled in the art. The invention should therefore not be limited to the particular embodiments discussed above, but rather is defined by the claims. While we described our method as it would specifically apply to the detection of pleural nodules in digital or digitized thoracic volumes, the present invention could also apply to other organ and organ regions.

What is claimed is:

1. A method of recovering nodules from digital images of an anatomical region comprising the steps of:
   performing a morphological operation on a region within the digital images to identify nodules smaller than a first size; and
   performing a surface-based analysis on at least one surface in the region within the digital images to identify nodules larger than the first size.

2. The method of claim 1 further including the step of highlighting nodules in the digital images corresponding to nodules identified by the morphological operation or by the surface-based analysis.

3. The method of claim 1 further including the step of highlighting nodules in a digital volume constructed from digital images corresponding to nodules identified by the morphological operation or by the surface-based analysis.

4. The method of claim 1 wherein the anatomical region is a lung field.

5. The method of claim 1 wherein the anatomical region is a heart, brain, spine, colon, liver or kidney.

6. The method of claim 1 wherein the region upon which the morphological operation is performed is a digital volume constructed from the digital images.

7. The method of claim 6 wherein the region upon which the morphological operation is performed is selected after a step of segmenting the digital volume.

8. The method of claim 1 wherein the region upon which the morphological operation is performed is selected after segmenting one or more of the digital images.

9. The method of claim 7 wherein the step of segmenting the digital volume further includes identifying a lung field region.

10. The method of claim 7 wherein the step of segmenting the digital volume further includes identifying a pleural boundary.

11. The method of claim 7 wherein the step of segmenting the digital volume further includes identifying a lobe of a lung.

12. The method of claim 1 further including the step of segmenting one or more of the digital images to identify surfaces for surface fitting.

13. The method of claim 1 further including the step of segmenting a digital volume created from the digital images to identify surfaces for surface-fitting.

14. The method of claim 13 wherein a surface identified for surface-fitting includes a lung surface.

15. The method of claim 14 wherein the lung surface is a lung apex, costal surface, lung base or mediastinal surface.

16. The method of claim 1 wherein the step of performing surface-based analysis is performed by surface-fitting with deformable models.

17. The method of claim 16 wherein the surface-fitting with deformable models is initialized using landmark points from a section of one or more digital images.

18. The method of claim 1 wherein the step of performing a morphological operation on a region further includes the steps of:
   performing a morphological dilation on the region with an ellipsoidal structural element; and
   performing morphological erosion on the region with the ellipsoidal structural element.

19. The method of claim 1 further including the step of displaying a post-processed digital image, said post-processed digital image being one of the digital images as processed by the morphological operation or surface-based analysis.

20. The method of claim 19 wherein the post-processed image includes one or more highlighted nodules.

21. The method of claim 20 wherein the step of displaying a post-processed digital image further includes displaying at least one of the digital images of the anatomical region, said at least one of the digital images of the anatomical region being a digital image not processed by the morphological operation or surface-based analysis and containing anatomical information associated with anatomical information of the post-processed digital image.

22. The method of claim 21 wherein the at least one of the digital images of the anatomical region displayed is shown with a highlighted location, said highlighted location associated with one or more of the highlighted nodules in the post-processed digital image.

23. The method of claim 1 further including the step of displaying one of the digital images, said one of the digital images having a location associated with an area corresponding to a location identified by the morphological operation or from surface-based analysis.

24. The method of claim 1 further including the step of displaying a post-processed digital image volume, said post-processed digital image volume constructed from digital images identified as containing anatomical information identified by the morphological operation or from surface-based analysis.

25. The method of claim 24 further including displaying at least one of the digital images of the anatomical regions, said at least one of the digital images of the anatomical region being a digital image not processed by the morphological operation or surface-based analysis and containing anatomical information contained in or associated with the post-processed digital image volume.

26. The method of claim 1 further including the step of performing noise reduction on the digital images.

27. The method of claim 1 further including the step of performing noise reduction on a digital volume constructed from some or all of the digital images.

28. The method of claim 1 wherein the step of performing a morphological operation is performed on a digital lung field image.

29. The method of claim 1 wherein the step of performing a morphological operation is performed using a morphological closing operation.

30. The method of claim 12 wherein a nodule identified by the morphological operation step or the surface-based analysis step is a pleural nodule.

31. The method of claim 30 wherein the pleural nodule is cancerous.

32. The method of claim 1 wherein the step of performing a morphological operation is performed using a morphological dilation operation.

33. The method of claim 1 wherein the step of performing a morphological operation is performed using a morphological dilation operation followed by a morphological erosion operation.

34. The method of claim 1 wherein the step of performing a morphological operation is performed using a morphological dilation operation with a structuring element.

35. The method of claim 34 wherein the structuring element is an elliptical structuring element.

36. The method of claim 1 wherein the step of performing a morphological operation is performed using morphological dilation with an elliptical structuring element performed on a region to detect nodules within the elliptical structuring element.

37. The method of claim 36 wherein the elliptical structuring element has an elliptical radius of 3 mm.

38. The method of claim 1 wherein the first size is the elliptical radius of an elliptical structuring element.

39. The method of claim 38 wherein the elliptical radius is 2 mm–4 mm.

40. The method of claim 1 wherein the first size is 3 mm.

41. The method of claim 1 wherein the step of performing a surface-based analysis is performed using a snake active surface model to fit a surface to a boundary.

42. The method of claim 41 wherein the snake active surface model uses a chamfer distance potential as a measure of the proximity of the deformable surface model to the boundary.

43. The method of claim 1 wherein the region upon which surface-based analysis is performed is a pleural surface.

44. The method of claim 1 wherein the step of performing a surface-based analysis requires fitting a pleural surface to a boundary.

45. The method of claim 41 wherein the boundary is a pleural boundary.

46. The method of claim 1 wherein the anatomical region is the lungs and the step of performing a surface-based analysis on at least one surface further includes the steps of:
   identifying lung border voxels;
   calculating a chamfer distance potential to the lung border voxels;
   initializing the surface; and
   deforming a snake active surface model under an external force and under an internal force.

47. The method of claim 46 wherein the external force is based on a chamfer distance potential.

48. The method of claim 46 wherein the internal force is based on a smoothness determination of the surface.

49. The method of claim 46 wherein the surface is a costal surface of the lungs and the lung border voxels are on a posterior border of the lungs.

50. The method of claim 46 wherein the surface is a lung base of the lungs and the lung border voxels are on an inferior border of the lungs.

51. The method of claim 46 wherein the surface is a mediastinal surface of the lungs and the lung border voxels are on an anterior border of the lungs.

52. A method of recovering nodules from digital images of an anatomical region comprising the steps of:
   recovering nodules below a first size by performing a morphological operation on at least one of the digital images comprising the steps of:
      performing a morphological dilation on a region within at least one of the digital images with a structuring element selected to be capable of detecting nodules having a size below the first size; and
      performing morphological erosion on the region within at least one of the digital images with the ellipsoidal structuring element; and
      performing a surface-based analysis on at least one surface in the region to identify nodules larger that the first size comprising the steps of:
      identifying border voxels;
      calculating a chamfer distance potential to the border voxels;
      initializing the surface; and
      deforming a snake active surface model based on a chamfer distance potential and based on a smoothness determination of the surface.

53. A computer system including software embodied in a computer-readable medium for recovering nodules from digital images of an anatomical region comprising the steps of:
   logic code for performing a morphological operation on a region within the digital images to identify nodules smaller than a first size; and
   logic code for performing a surface-based analysis on at least one surface in the region within the digital images to identify nodules larger than the first size.

* * * * *